(12) United States Patent
Veyrac et al.

(10) Patent No.: US 11,137,492 B2
(45) Date of Patent: Oct. 5, 2021

(54) AIRCRAFT-LANDING-ASSISTANCE METHOD AND DEVICE FOR ALIGNING AN AIRCRAFT WITH A RUNWAY

(71) Applicant: THALES, Courbevoie (FR)

(72) Inventors: Yoan Veyrac, Merignac (FR); Patrick Garrec, Merignac (FR); Pascal Cornic, Brest (FR)

(73) Assignee: THALES, Courbevoie (FR)

( * ) Notice: Subject to any disclaimer, the term of this patent is extended or adjusted under 35 U.S.C. 154(b) by 106 days.

(21) Appl. No.: 16/691,005

(22) Filed: Nov. 21, 2019

(65) Prior Publication Data

US 2020/0191948 A1   Jun. 18, 2020

(30) Foreign Application Priority Data

Dec. 13, 2018   (FR) ...................................... 1872814

(51) Int. Cl.
*G01S 13/91*   (2006.01)
*G01S 7/41*    (2006.01)

(52) U.S. Cl.
CPC ............. *G01S 13/913* (2013.01); *G01S 7/411* (2013.01); *G01S 7/418* (2013.01)

(58) Field of Classification Search
CPC ........ G01S 13/913; G01S 7/411; G01S 7/418; G01S 13/42; G01S 13/426; G01S 13/4445
See application file for complete search history.

(56) References Cited

U.S. PATENT DOCUMENTS

| 5,640,165 A | 6/1997 | Hui et al. |
| 7,619,556 B1 | 11/2009 | McCusker |
| 2002/0017042 A1* | 2/2002 | Schieferstein ............ B64F 1/18 40/217 |
| 2014/0283728 A1* | 9/2014 | Wang ...................... B63B 35/50 114/261 |
| 2018/0259641 A1 | 9/2018 | Vacanti |

(Continued)

FOREIGN PATENT DOCUMENTS

EP   3 214 461 A1   9/2017

OTHER PUBLICATIONS

Caekenberghe, et al., "A 94 GHz OFDM Frequency Scanning Radar for Autonomous Landing Guidance", 2007 IEEE Radar Conference, pp. 248-253, Apr. 17, 2007.

(Continued)

*Primary Examiner* — Timothy X Pham
(74) *Attorney, Agent, or Firm* — BakerHostetler

(57) ABSTRACT

The method includes a step of forming, with a radar, a number N of beams of equal angular width that irradiate a runway and a portion of the surroundings of the runway; a step of dividing the zone irradiated by the beams into distance-angle boxes, the beams delineating the boxes anglewise; a step of taking measurements of backscattered power received from distance-angle boxes, the measurements being carried out for a set of pairs of boxes, a pair being composed of two boxes of same distance one of which, called the right box, crosses the right edge (3D) of the runway, and the other of which, called the left box, crosses the left edge (3G); a step of computing, for each pair, the difference in backscattered power between the right box and the left box, the aircraft being aligned with the axis when the difference is zero for at least two pairs of distance-angle boxes.

8 Claims, 4 Drawing Sheets

(56) References Cited

U.S. PATENT DOCUMENTS

2019/0147752 A1* 5/2019 Scarlatti .............. G08G 5/0039
                                                          701/120
2019/0347943 A1* 11/2019 Pesik ..................... B64D 47/08

OTHER PUBLICATIONS

Brailovsky, et al., "REVS: a radar-based enhanced vision system for degraded visual environments", Visual Communications and Image Processing, vol. 9087, pp. 908708-908708, Jun. 19, 2014.

* cited by examiner

AIRCRAFT-LANDING-ASSISTANCE METHOD AND DEVICE FOR ALIGNING AN AIRCRAFT WITH A RUNWAY

CROSS-REFERENCE TO RELATED APPLICATIONS

This application claims priority to foreign French patent application No. FR 1872814, filed on Dec. 13, 2018, the disclosure of which is incorporated by reference in its entirety.

FIELD OF THE INVENTION

The present invention relates to an aircraft-landing-assistance method and device for aligning, in the final landing phase, an aircraft with a runway, in particular under low-visibility conditions.

The technical field of the invention is that of detection and recognition of an environment relatively to the position of an observer. The main field of exploitation is that of radar, for landing-assistance applications. This invention more precisely relates to enhanced-vision-system (EVS) landing-assistance systems.

BACKGROUND

The invention addresses the problem of assisting aircraft with landing on a runway, under low-visibility conditions, and in particular conditions that are such because of difficult meteorological conditions, for example in case of fog. Standards set rules for visibility when landing. These rules are converted into decision thresholds that refer to the altitude of the aeroplane during its descent phase. At each of these thresholds, identified visual references must be obtained for the landing manoeuvre to continue, it otherwise being necessary to abort it. Aborted landing manoeuvres cause real problems in the management of air traffic and in planning flights. It is necessary to estimate, before takeoff, whether or not it will be possible to land at the destination on the basis of weather forecasts of variable reliability, and where appropriate make provision for fall-back solutions.

The problem of landing aircraft under low-visibility conditions has led to the development of a number of techniques that are currently in use.

One of these techniques consists in using an instrument landing system (ILS). ILS systems are based on radio frequency equipment installed on the ground, by the runway, and a compatible instrument placed on board the aircraft. The use of such a guidance system requires expensive equipment and pilots to undergo specific training. Such a guidance system cannot moreover be installed at every airport. This system is not widely used and is currently being phased out.

Another alternative is GPS landing assistance. Although it is of sufficient precision, the reliability of this solution is unsatisfactory since it may easily be jammed, whether intentionally or not. Its integrity is not guaranteed.

Lastly, the enhanced-vision-system (EVS) technique is also employed. Its principle is to use sensors that perform better than the eye of the pilot under poor meteorological conditions, and to embed the collected information in the field of view of the pilot, by means of a head-up display or on the visor of a helmet worn by the pilot. This technique is essentially based on the use of sensors to detect the radiation emitted by lights placed along the runway and by the approach lighting system. Incandescent lights produce visible light but they also emit in the infrared domain. Sensors in the infrared domain allow this radiation to be detected and the detection range is better than that of the human eye in the visible domain, under poor meteorological conditions. An improvement in visibility therefore allows, to a certain extent, approach phases to be improved and missed approaches to be limited. However, this technique is based on the parasitic infrared radiation emitted by lights present in the vicinity of the runway. With a view to increasing durability, the current tendency is to replace incandescent lights with LED lights. The latter have a less extensive spectrum in the infrared domain. A collateral effect is therefore to cause a technical obsolescence of EVS systems based on infrared sensors.

An alternative to infrared sensors is to obtain images using a radar sensor employing a millimetre-wave or centimetre-wave band. Certain frequency bands that lie outside of the absorption peaks of water vapour have a very low sensitivity to difficult meteorological conditions. Such sensors therefore allow an image to be produced through fog for example. However, even though these sensors have a fine resolution distancewise, they have an angular resolution that is much lower than optical solutions. The resolution is directly related to the size of the antennas used, and it is often too low to precisely locate the position of the runway at a sufficient distance to perform realignment manoeuvres.

There is therefore a need for new technical solutions allowing approach manoeuvres to be guided, with a view to landing under low-visibility conditions.

The use of radar sensors allows meteorological conditions to be made irrelevant. It is possible to make provision for landing-assistance systems using radar imaging that allow a nominal landing trajectory to be joined. In the final landing phase, it may be necessary to finely confirm the alignment of the path of the aircraft with the runway.

SUMMARY OF THE INVENTION

One aim of the invention is in particular to allow an aircraft in final landing phase to be finely guided. To this end, one subject of the invention is an aircraft-landing-assistance method for aligning an aircraft with a given runway, said aircraft being equipped with a radar, said method comprising at least:
a step of forming, with said radar, a number N of beams that irradiate said runway and a portion of the surroundings of said runway;
a step of dividing the zone irradiated by said beams into distance-angle boxes, said beams delineating said boxes anglewise;
a step of taking measurements of backscattered power received from distance-angle boxes, said measurements being carried out for a set of pairs of boxes, a pair being composed of two boxes of same distance one of which, called the right box, crosses the right edge of said runway, and the other of which, called the left box, crosses the left edge;
a step of computing, for each pair, the difference in backscattered power between said right box and said left box, said aircraft being aligned with said axis when said difference is zero for at least two pairs of distance-angle boxes.

x being the deviation between the axis of sight of said radar and the axis of said runway, said deviation is for example expressed as a function of said difference in received backscattered power ΔP between the left and right boxes of a pair using the following relationship:

$$|\Delta P| = 2 \cdot |P(H) - P(P)| \cdot x$$

P(H) and P(P) being the backscattered power per unit length for the surroundings of said runway and for said runway, respectively, said deviation x being transmitted by said radar to the means for piloting said aircraft.

In one particular implementation, the anglewise and positionwise deviation in the alignment between said aircraft and said runway is estimated via a linear interpolation of the differences in backscattered power for at least two pairs of distance-angle boxes.

The gradient in backscattered power along the distance boxes of at least one beam crossing said runway is for example used to determine the positions of the points of intersection between the edges of said beam and said runway in order to refine the estimate of the deviation in the alignment of the aircraft with respect to said runway.

The deviation in the alignment between the aircraft and the runway is for example refined over time by filtering successive backscattered-power measurements carried out during the manoeuvre of landing said aircraft.

The path of said aircraft is for example controlled so that said difference in received backscattered power, for at least two pairs of distance-angle boxes, tends towards the value zero.

Complementary information on the alignment of said aircraft is for example obtained from lights of the approach lighting system and from centreline lights of said runway.

Another subject of the invention is a device for implementing such a method.

BRIEF DESCRIPTION OF THE DRAWINGS

Other features and advantages of the invention will become apparent from the following description, which is given with reference to the appended drawings, which show.

DETAILED DESCRIPTION

Figure 1:
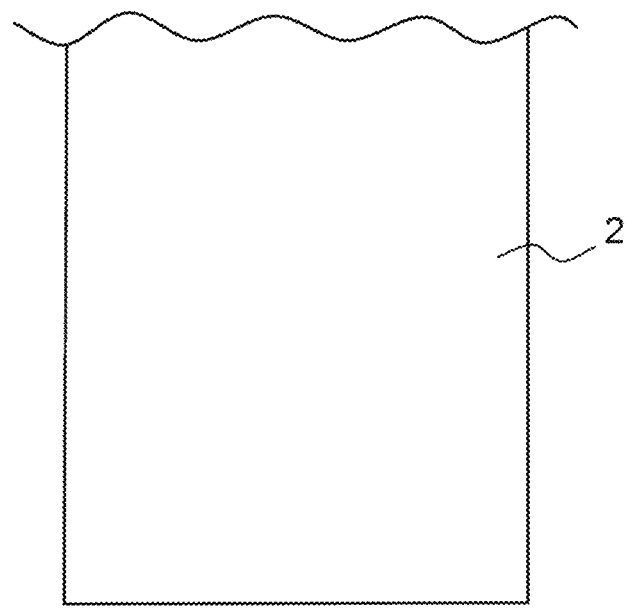
[FIG. 1] an aircraft in final landing phase
Figure 1:
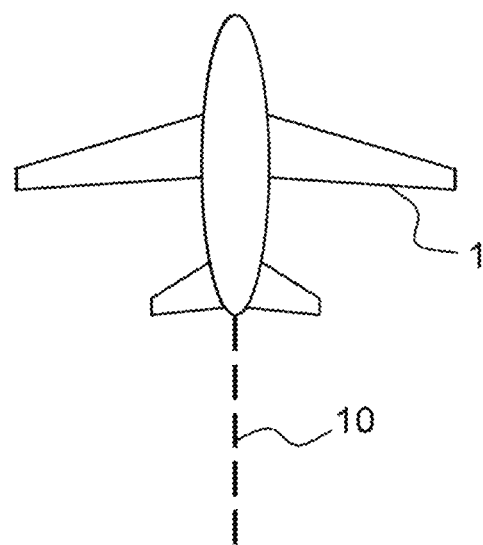

FIG. 1 illustrates a situation in which an aircraft 1 is in a final phase of landing on a runway 2 after having joined a nominal landing path. The method for joining this path is not the subject of the present invention. Said path may or may not be joined using a landing-assistance system. The aircraft being equipped with a radar sensor, the subject matter of the invention relates to the final landing phase when the sensor carrier is aligned with the runway and on a nominal descent slope. The subject matter of the invention more particularly relates to radar processing allowing the alignment of the carrier 1 with the runway 2 to be finely confirmed.

Figure 2A:
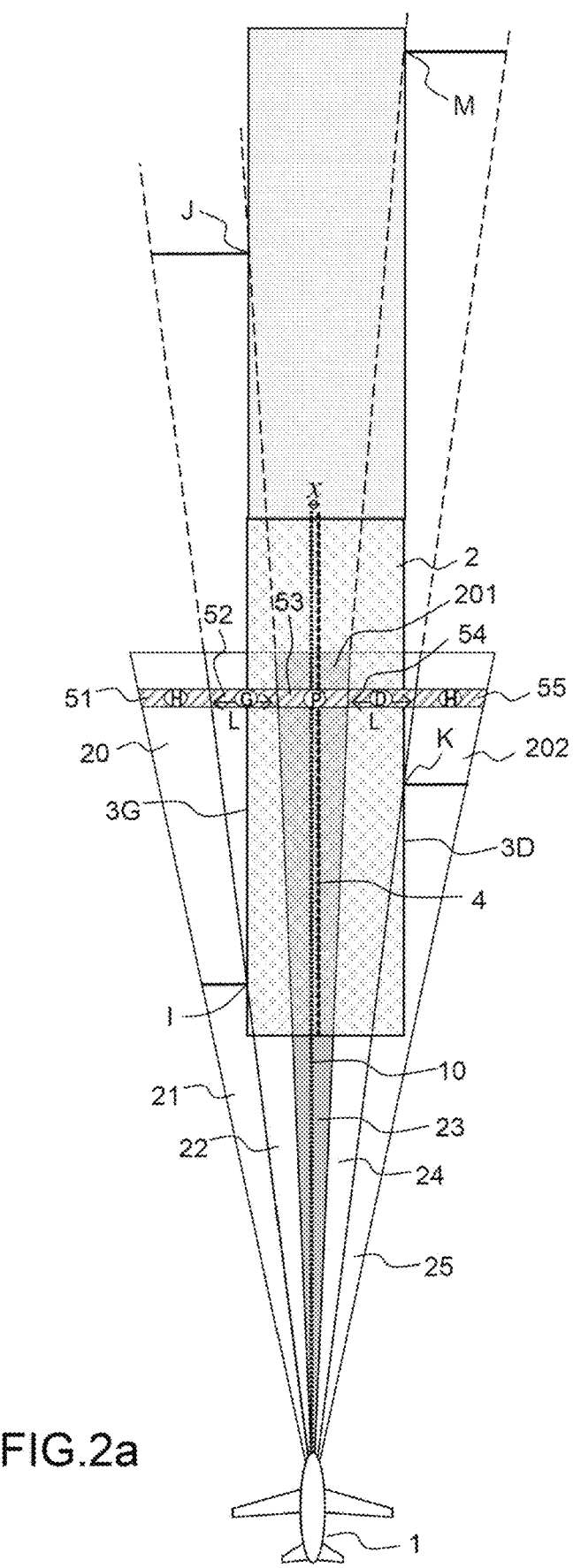
[FIG. 2a] an illustration of the method according to the invention
Figure 2B:
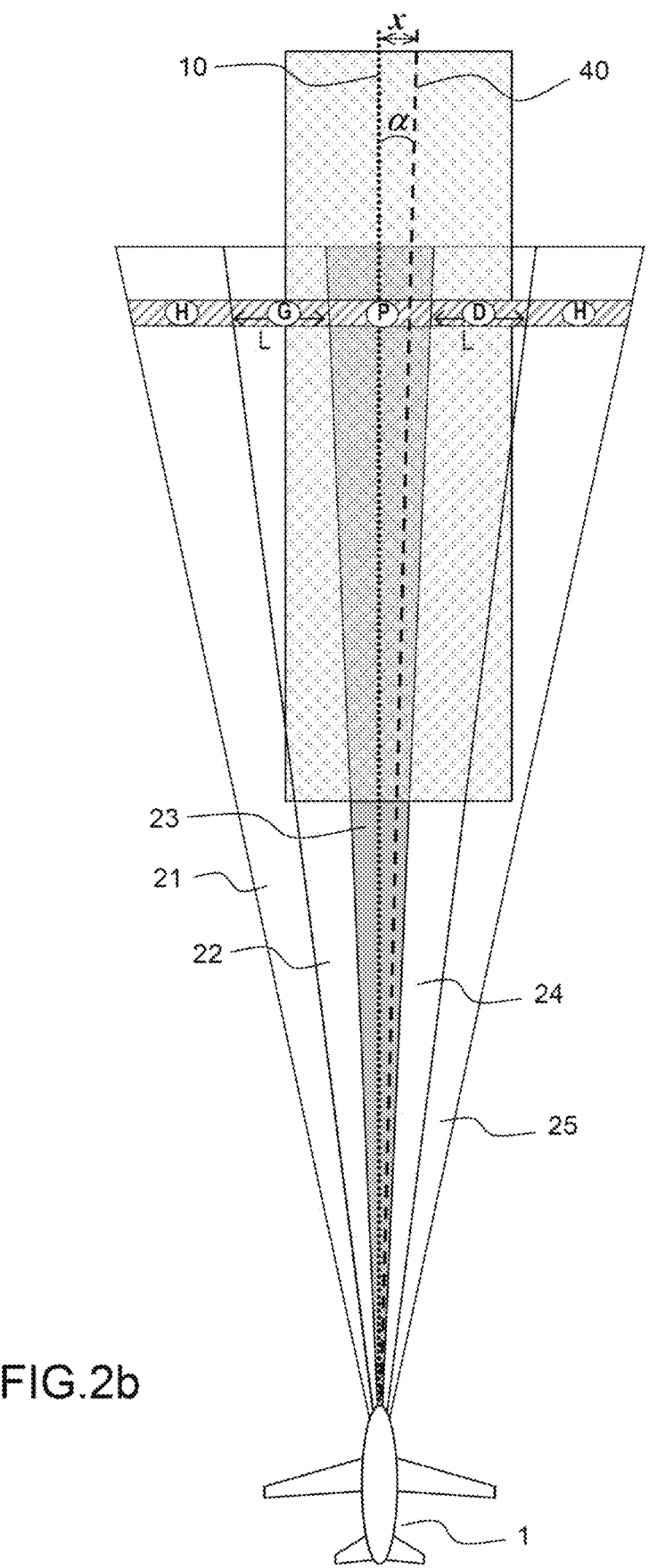
[FIG. 2b] an illustration of the method according to the invention

FIGS. 2a and 2b illustrate the aligning method according to the invention. FIG. 2a illustrates the case where the axis of sight 10 of the radar is parallel to the axis 4 of the runway. FIG. 2b illustrates the more general case where the axis of sight 10 makes an angle α to the axis 4 of the runway, this angle α however being small. This is indeed the case in practice, because the aircraft is in its final landing phase and has already engaged a process of alignment with the runway. Below, to illustrate the principle according to the invention, the particular case of FIG. 2a will be referred to (the computations applied to case 2a being generalizable to case 2b because of the small value of a), the general case of FIG. 2b being mentioned where needs be.

In the final landing phase, when the carrier 1 is aligned with the runway 2 and on a nominal descent slope, the radar sensor allows the alignment with the runway to be finely confirmed by virtue of the method according to the invention, based on a relative balance.

A plurality of radar beams 21, 22, 23, 24, 25 are formed, each having a given angular width. In one possible embodiment, the beams have substantially the same width, exterior beams however being slightly wider in the case of use of an electronically scanned antenna.

At a given radial distance, certain beams 23 intercept a segment 201 of the runway, others 22, 24 intercept the border 3D, 3G of the runway, and lastly others 21, 25 solely intercept the surroundings 202 of the runway (typically a grassy zone). The beams 23 that solely intercept a runway segment yield a reference runway backscatter level, which is very low. The beams 21, 25 that solely intercept the surroundings of the runway give a higher reference backscatter level. The beams 22, 24 that intercept the border give a backscatter level corresponding to a weighted sum of that of the runway and of its surroundings. If the carrier is correctly aligned with the central axis 4 of the runway, there is necessarily a symmetry between these beams. In the contrary case, a differential disequilibrium appears between the beams that intercept the borders of the runway, this is the notion of relative balance that was mentioned above. A differential measurement then allows the position of the carrier with respect to the axis of the runway to be measured. This measurement is possible only if the runway has a uniform backscatter coefficient and if the surroundings also have a backscatter coefficient that is uniform over all the area thereof. This assumption is reasonable for the common case of grassy surroundings.

The realigned position of the inertial measurement unit and the data thus obtained are correlated with a view to making a decision.

FIGS. 2a and 2b illustrate this principle with a five-beam example.

These radar beams 21, 22, 23, 24, 25 are shown, and their intersection with the anglewise and distancewise resolution plane produces distance-angle boxes. Five of these boxes 51, 52, 53, 54, 55 are shown for a given distance. They are delineated angularly by the five radar beams. The central beam produces a distance box 53, labelled P, that lies level with the runway. The most lateral beams 21, 25 produce boxes 51, 55, labelled H, that intercept the surroundings 202 of the runway (for example a grassy area of land). Boxes 52, 54, which intercept the left border 3G (box labelled G) and the right border 3D (box labelled D) of the runway, each receive some backscattered power from the runway 2 and some backscattered power from the surroundings 202.

If the axis of sight 10 of the airborne radar is aligned with the axis 4 of the runway, the received power in each of the left (G) and right (D) boxes is similar. Otherwise, there is a power difference between the boxes (G) and (D), which is proportional to the deviation between the axis of sight of the radar and the axis of the runway.

The size of all the boxes is considered to be similar, this being a valid approximation for small off-pointing angles. The texture of the runway and of the surroundings is also considered to be uniform (as indicated above) and to be characterized by a respective backscatter coefficient. If x is the deviation between the axis of sight 10 of the radar and the axis 4 of the runway, the difference in received power ΔP (in absolute value) between the boxes (G) and (D) is expressed:

$$|\Delta P| = 2 \cdot |P(H) - P(P)| \cdot x \quad (1)$$

P(H) and P(P) being the backscattered power per unit length for the surroundings 202 of the runway (grassy zone for example) and for the runway 2, respectively. P(H) and P(P) are moreover known and may be easily be determined using calibration methods. In particular, boxes 53 solely lying solely level with the runway give a first reference level (lowest backscatter level) and boxes 51, 52 lying solely level with the surroundings of the runway give another reference level (highest backscatter level).

Given that it is possible to measure the backscattered power for each distance box, to the left (G) and to the right (D), it is possible to obtain |ΔP|. From this measurement of |ΔP|, x is obtained by applying relationship (1) above.

Knowledge of x allows the piloting to be corrected in order to join the axis of the runway.

The precision with which x is determined increases as the contrast between the textures (i.e. between P(H) and P(P)) increases, and with the uniformity of said textures.

The case where the aircraft is correctly aligned but slightly offset from the axis of the runway, as illustrated in FIG. 2a, is a particular case. Specifically, the aircraft may not be entirely aligned as indicated above. In which case, there is an angle error in addition to the offset x, and this could complicate a little the computations and the associated explanations. However, in real life, the angles in question are small and do not have an impact on the computations for a given distance d, in the context of the invention. In order to take the distance d and the angle error a into account, x is considered to be a function of d, x=f(d), and relationship (1) is applied for all the distance boxes, x varying from one distance to the next. In practice, at least two distances may be selected as described below.

This basic principle may be extended to a plurality of emission and reception polarizations, in order to improve measurement precision.

To confirm correct alignment of the carrier with the runway, equilibrium must be achieved between the boxes (G) and (D) for all the distance boxes that meet the condition of backscatter uniformity. This equilibrium is achieved when |ΔP| is substantially zero. The method thus detects symmetry between the power backscattered by the right and left of the runway and its surroundings, within clearly defined limits that allow this symmetry to be measured.

Knowledge of the width of the runway makes it possible to know the position of the distance-angle boxes with respect to the edges of the runway, this consolidating the computations employed to determine the respective balances (detection of left-right power symmetries).

To confirm the alignment (angle error α=0 and lateral-offset error x=0), it is not necessary to detect symmetry for all the boxes that cross the runway edges. It is enough to take into account some of the boxes for a given distance. A minimal solution may even consist in determining the balance of boxes at a distance d1 and of boxes at another distance d2, there being alignment if symmetry is detected at these two distances. It is checked whether x1=0 at the distance d1 and whether x2=0 at the distance d2. The error x evaluated at a plurality of distances allows the angle error to be estimated, the various evaluations moreover being able to be correlated with runway-width assumptions.

The evaluation of the anglewise and positionwise alignment deviation between the carrier and the runway may be carried out via a linear interpolation of the deviations x obtained for at least two pairs of distance-angle boxes. This interpolation will advantageously be carried out using all the available pairs of distance-angle boxes in order to improve the precision of the method.

FIGS. 2a and 2b give an example of balance determined with five beams though in practice it is possible to use a number N of beams, N being higher than 5 and not necessarily uneven. The higher the number of beams, the higher the number of distance-angle boxes that cross the edges 3 of the runway, allowing a finer balance to be achieved.

Figure 3:
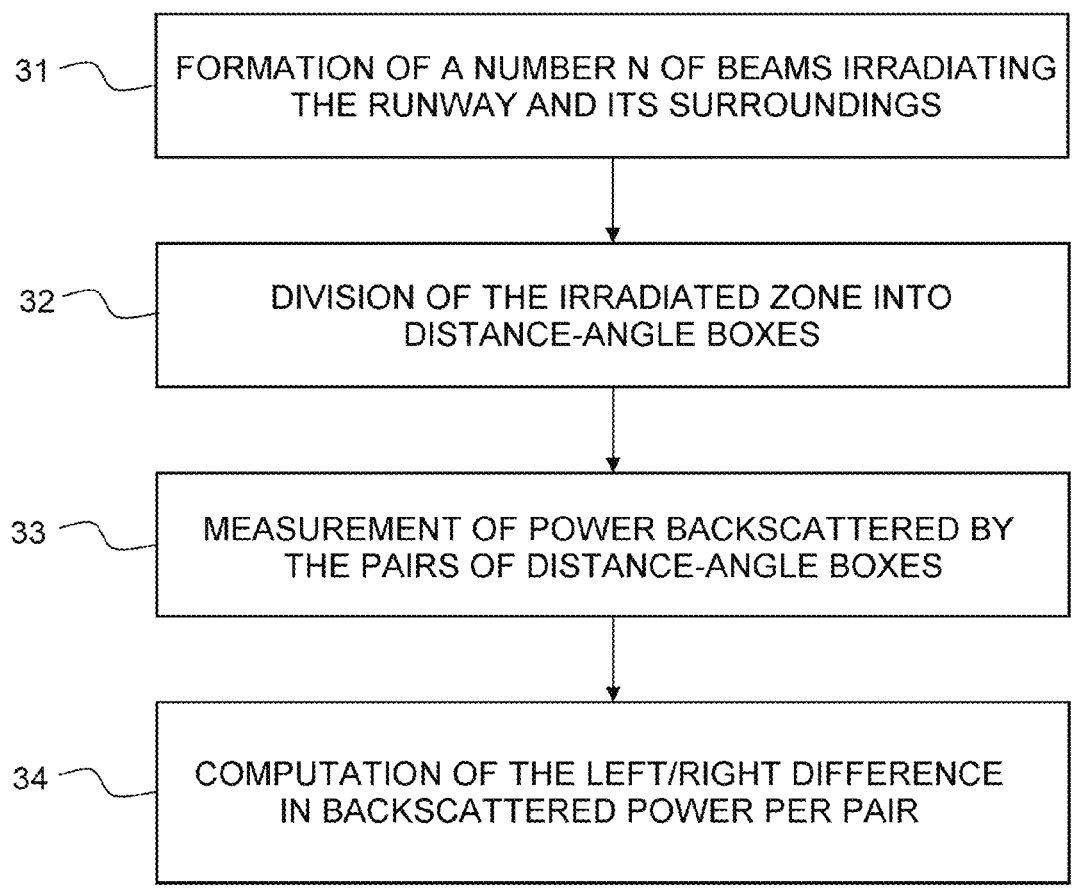
[FIG. 3] a presentation of possible steps for implementing the method according to the invention.

FIG. 3 summarizes the main steps of the method according to the invention, such as described above.

In a first step 31, the radar with which the aircraft is equipped forms a number N of beams that irradiate said runway and a portion of the surroundings of said runway. The emitted beams have the same angular width.

In a second step 32, the zone irradiated by said beams is divided into distance-angle boxes, said beams delineating said boxes anglewise. This division is carried out by the processing means of the radar.

In a following step 33, the radar carries out measurements of the power backscattered by the distance-angle boxes, said measurements being carried out for a set of pairs of boxes 52, 54. Each pair is composed of two boxes of same distance one 54 of which crosses the right edge 3D of the runway and the other 52 of which crosses the left edge 3G.

A following step 34 computes, for each pair, the difference in backscattered power between the right box 54 and the left box 52. The aircraft is aligned with the axis 4 when the difference is zero for each pair of boxes. At the very least, it is possible to consider the aircraft to be aligned if the difference in backscattered power between the left and right is zero for at least two pairs of distance-angle boxes.

The power-difference computation gives the alignment deviation x as described above. The path of the aircraft is controlled so as to minimize this deviation or in other words so that the difference in received backscattered power per pair of boxes 52, 54 tends towards the value zero. To this end, this deviation is transmitted by the radar to the means for piloting the aircraft, these means being automatic or manual (the pilot).

A complementary confirmation of the alignment may be obtained from lights of the approach lighting system and from any runway-centreline lights.

The runway threshold is for its part precisely positioned distancewise, by measuring the contrast between the runway and the surroundings, or between the runway and the runway threshold lights.

Certain thresholds are offset with respect to the border of the runway. The location of various recognizable structures (runway border and runway threshold lights) with respect to the point of touchdown of the wheels may be obtained by gathering information on the runway or injected if the precise geometry of the runway is known.

Likewise, as the width of the beams and of the runway are known (the latter datum being given in tables) it is also possible, for each beam 22, 24 that crosses the runway, to determine the distance boxes that correspond to the intersections I, J and K, M between the edges of the beam and the runway via a computation of the gradient of the backscattered power along the distance axis.

In FIG. 2a pairs of additional points I, J and K, M are determined that allow the runway edges to be traced. Between these points, the backscattered power varies linearly between the two extreme "runway" and "off-runway" values. It is merely necessary to consider the values per unit length of backscattered power in order to compensate for the effect of the widening of the distance boxes as a function of increasing distance from the radar.

This method allows the estimated deviation between the axis of sight of the radar 10 and the axis of the runway 4 to be refined.

It will be noted that, since the images are captured at a relatively high rate, it may be recommendable to integrate the information over time in order to refine the estimations of alignment and of precise position over time. To this end, the movement of the carrier may be compensated for by taking into account its velocity vector, in particular when the distance of the various boxes is taken into account. By assigning weights to the values of the lateral and angular deviation between the aircraft and the runway, i.e. the values that are found over time, and by applying a filter (for example an alpha beta filter), it is possible to noticeably improve the process described above and to mitigate cases of irregular runway edges or of runways that are nonuniform from a backscattering point of view.

The invention claimed is:

1. An aircraft-landing-assistance method for aligning an aircraft with a runway, said aircraft being equipped with a radar, the method comprising:
 a step of forming, with said radar, a number N of beams that irradiate said runway and a portion of a surroundings of said runway;
 a step of dividing a zone irradiated by said beams into distance-angle boxes, said beams delineating said boxes anglewise;
 a step of taking measurements of backscattered power received from distance-angle boxes, said measurements being carried out for a set of pairs of boxes, a pair being composed of two boxes of same distance one of which, being a right box, crosses a right edge (3D) of said runway, and the other of which, being a left box, crosses a left edge (3G);
 a step of computing, for each pair, a difference in backscattered power between said right box and said left box, said aircraft being aligned with an axis of the runway when said difference is zero for at least two pairs of distance-angle boxes.

2. The method according to claim 1, wherein x being a deviation between an axis of sight of said radar and the axis of said runway, said deviation is expressed as a function of said difference in received backscattered power $\Delta P$ between the left and right boxes of a pair using the following relationship:

$$|\Delta P|=2\cdot|P(H)-P(P)|\cdot x$$

P(H) and P(P) being the backscattered power per unit length for the surroundings of said runway and for said runway, respectively, said deviation x being transmitted by said radar to a means for piloting said aircraft.

3. The method according to claim 1, wherein an anglewise and a positionwise deviation in the alignment between said aircraft and said runway is estimated via a linear interpolation of the differences in backscattered power for at least two pairs of distance-angle boxes.

4. The method according to claim 1, wherein a gradient in backscattered power along the distance boxes of at least one beam crossing said runway is used to determine a position of points of intersection (I, J, K, M) between the edges of said beam and said runway in order to refine the estimate of a deviation in the alignment of the aircraft with respect to said runway.

5. The method according to claim 1, wherein a deviation in the alignment between the aircraft and the runway is refined over time by filtering successive backscattered-power measurements carried out during a manoeuvre of landing said aircraft.

6. The method according to claim 1, wherein a path of said aircraft is controlled so that said difference in received backscattered power, for at least two pairs of distance-angle boxes, tends towards the value zero.

7. The method according to claim 1, wherein complementary information on the alignment of said aircraft is obtained from lights of an approach lighting system and from centreline lights of said runway.

8. A radar device, configured to implement the method according to claim 1.

\* \* \* \* \*